(12) United States Patent
Kang et al.

(10) Patent No.: US 8,986,577 B2
(45) Date of Patent: Mar. 24, 2015

(54) SILICON-CARBON COMPOSITE FOR NEGATIVE ELECTRODE OF LITHIUM SECONDARY BATTERY

(75) Inventors: Yong-Mook Kang, Seoul (KR); Young-Min Lee, Incheon (KR); Kyeong-Se Song, Ansan-si (KR)

(73) Assignee: Dongguk University Industry-Academic Cooperation Foundation, Seoul (KR)

( * ) Notice: Subject to any disclaimer, the term of this patent is extended or adjusted under 35 U.S.C. 154(b) by 207 days.

(21) Appl. No.: 13/591,739

(22) Filed: Aug. 22, 2012

(65) Prior Publication Data
US 2014/0021415 A1    Jan. 23, 2014

(30) Foreign Application Priority Data

Jul. 23, 2012   (KR) .................. 10-2012-0079965

(51) Int. Cl.
| | | |
|---|---|---|
| H01B 1/04 | (2006.01) | |
| H01M 4/04 | (2006.01) | |
| H01M 4/133 | (2010.01) | |
| H01M 4/134 | (2010.01) | |
| H01M 4/1393 | (2010.01) | |

(Continued)

(52) U.S. Cl.
CPC ............ *H01M 4/0438* (2013.01); *Y02E 60/122* (2013.01); *H01M 4/0471* (2013.01);
(Continued)

(58) Field of Classification Search
CPC ........ H01M 4/386; H01M 4/362; H01M 4/02
USPC .......... 252/502; 428/404; 429/209, 211, 220; 977/734
See application file for complete search history.

(56) References Cited

U.S. PATENT DOCUMENTS

| | | | |
|---|---|---|---|
| 2008/0160409 A1* | 7/2008 | Ishida et al. .................. | 429/220 |
| 2010/0221544 A1* | 9/2010 | Baumer et al. ................ | 428/404 |
| 2010/0330419 A1* | 12/2010 | Cui et al. ...................... | 429/209 |

OTHER PUBLICATIONS

Youngmin Lee et al., Electrospun SiO Composite Nanofibers as High-Capacity Anode Materials for Lithium Rechargeable Batteries, Division of Advanced Materials Engineering, Kongju National University, The 9th International Nanotech Symposium & Exhibition in Korea, Nanotechnology, Bridge to Global Happiness, Aug. 24, 2011.

(Continued)

*Primary Examiner* — Khanh Tuan Nguyen
(74) *Attorney, Agent, or Firm* — Lexyoume IP Meister, PLLC

(57) ABSTRACT

Disclosed is a silicon-carbon composite for a negative active material of a lithium secondary battery, including carbon nanofibers and silicon particles, wherein the silicon particles are coated with amorphous silica. In the silicon-carbon composite of the invention, silicon is provided in the form of a composite with carbon fibers and the surface of silicon particles is coated with amorphous silica, thereby reducing volume expansion upon lithium ion insertion and exhibiting superior ionic conductivity and electrical conductivity to thus maintain high capacity, and also, amorphous silica-coated silicon is positioned inside the carbon fibers having a one-dimensional structure, thus ensuring a large specific surface area and a stable composite structure.

11 Claims, 4 Drawing Sheets

(51) Int. Cl.
*H01M 4/1395* (2010.01)
*H01M 4/36* (2006.01)
*H01M 4/38* (2006.01)
*H01M 4/587* (2010.01)

(52) U.S. Cl.
CPC .............. *H01M 4/133* (2013.01); *H01M 4/134* (2013.01); *H01M 4/1393* (2013.01); *H01M 4/1395* (2013.01); *H01M 4/362* (2013.01); *H01M 4/366* (2013.01); *H01M 4/386* (2013.01); *H01M 4/587* (2013.01); *Y10S 977/734* (2013.01)
USPC ........... 252/502; 428/404; 429/209; 429/211; 429/220; 977/734

(56) References Cited

OTHER PUBLICATIONS

Youngmin Lee et al, Electrospun Si-carbon Composite Nanofibers as High-Capacity Anode Materials for Lithium Rechargeable Batteries, BA-O_07, p. 43, Apr. 12, 2012.

Youngmin Lee et al., Electrospun Si-Carbon Composite Nanofibers as High-Capacity Anode Materials for Lithium Rechargeable Batteries, Div. of Materials Science & Engineering, Hanyang Univ., International Meeting on Lithium Batteries, New Era for Smart Energy Storage, Jun. 17, 2012.

* cited by examiner

SILICON-CARBON COMPOSITE FOR NEGATIVE ELECTRODE OF LITHIUM SECONDARY BATTERY

BACKGROUND OF THE INVENTION

1. Field of the Invention

The present invention relates to a silicon-carbon composite for a negative active material of a lithium secondary battery, and more particularly to a silicon-carbon composite for a negative active material of a lithium secondary battery, which may reduce volume expansion upon lithium ion insertion and may exhibit superior ionic conductivity and electrical conductivity to thereby maintain high capacity.

2. Description of the Related Art

Secondary batteries are being used as large power storage batteries for electric vehicles or battery power storage systems and small high-performance energy sources for portable electronic devices such as mobile phones, camcorders, notebooks, etc. In order to reduce the size of portable electronic devices and achieve long-term continuous use, secondary batteries able not only to achieve lightness of parts and low power consumption but also which can ensure high capacity despite being small are required.

Recently, in the market for secondary batteries, the development of a negative active material which enables large size, high capacity and high performance has become essential, in order to be used in portable electronic devices and information communication devices, and also in energy storage devices for hybrid vehicles (HEV or PHEV) or power generation systems.

However, highly crystalline carbon-based active materials that are commercially available as a negative active material for a conventional secondary battery have a limited theoretical capacity of 372 mAh/g despite having superior characteristics as active materials for batteries. Hence, the development of a non-carbon-based negative active material is essential to the manufacture of high-capacity and high-performance lithium secondary batteries.

In the non-carbon-based negative active material, silicon (Si) has a high discharge capacity of 4,200 mAh/g and a very low lithium reaction potential of 0.4 V ($Li/Li^+$), and is thus known to be the most appropriate for a negative material.

However, silicon is problematic because volume expansion takes place at up to 400% at a maximum upon insertion (charge) of lithium ions, and thus the capacity is not maintained, and also because of low electrical conductivity or the like, and thereby it is necessary to solve the above problems before silicon can be commercialized as a negative active material.

PRIOR ART REFERENCE

Patent Literature (Patent Literature 1) Korean Patent No. 059596
(Patent Literature 2) Korean Patent No. 1042009

SUMMARY OF THE INVENTION

Accordingly, the present invention has been made keeping in mind the above problems encountered in the related art, and an object of the present invention is to provide a silicon-carbon composite for a negative active material of a lithium secondary battery, which may exhibit superior ionic conductivity and electrical conductivity while reducing volume expansion upon charge-discharge because of the unique structures of silicon and carbon, thereby maintaining high capacity.

Another object of the present invention is to provide a negative electrode of a lithium secondary battery, manufactured using the silicon-carbon composite as above, and a lithium secondary battery including the negative electrode.

In order to accomplish the above objects, the present invention provides a silicon-carbon composite for a negative active material of a lithium secondary battery, comprising carbon nanofibers and silicon particles, wherein the silicon particles are coated with amorphous silica.

In the silicon-carbon composite, the silicon particles may be dispersed in the carbon nanofibers.

The amount of the silicon particles may be 3~60 vol %, but the present invention is not limited thereto.

The amount of amorphous silica may be 0.1~25 wt % based on the total weight of silicon particles and amorphous silica, but the present invention is not limited thereto.

The silicon-carbon composite may be for example prepared by electrospinning a mixture solution comprising a polymer material and silicon particles to form a composite having a one-dimensional structure, and then heat-treating the composite.

The polymer material may comprise at least one selected from the group consisting of polyacrylonitrile (PAN), polyvinyl alcohol (PVA), polyvinylpyrrolidone (PVP), polyethylene oxide (PEO), polyvinylidene fluoride (PVDF), polymethylmethacrylate (PMMA), polyacrylic acid, and polyurethane.

As such, the electrospinning may be performed at a humidity of 36% or less and a temperature of 34° C. or less.

Also, the electrospinning may be performed using a nozzle having a size ranging from 17 gauge to 25 gauge.

Furthermore, the electrospinning may be performed by applying a voltage of 0.5~3.0 kV/cm.

The heat-treating may be performed via primary heat treatment at 230~350° C. for 1~10 hr and then secondary heat treatment at 500~900° C. for 1~7 hr.

The secondary heat treatment may be performed in a gas mixture environment of an inert gas and a reducible gas.

In addition, the present invention provides a negative electrode of a lithium secondary battery, comprising the above silicon-carbon composite, and a lithium secondary battery comprising the above negative electrode.

DESCRIPTION OF SPECIFIC EMBODIMENTS

Figure 1:
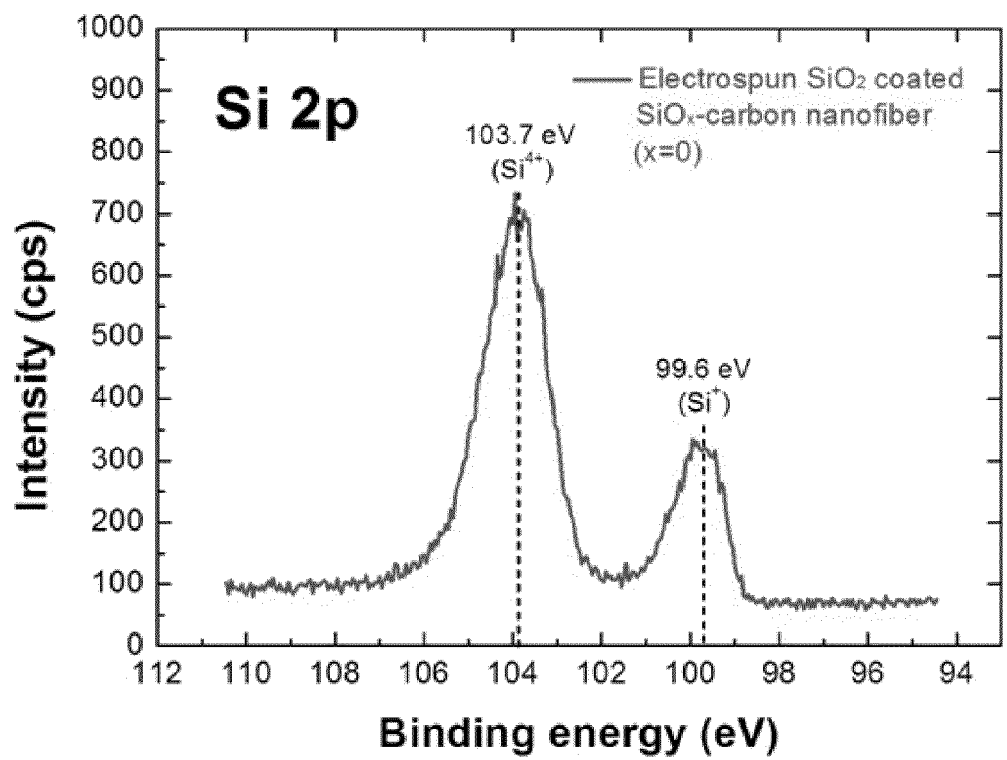
FIG. 1 illustrates X-ray photoelectron spectroscopy (XPS) results of an amorphous silicon oxide ($SiO_2$)-coated silicon ($SiO_x$, $0 \leq x \leq 2$)-carbon composite, according to an embodiment of the present invention.

Hereinafter, a detailed description will be given of the present invention.

According to the present invention, a silicon-carbon composite for a negative active material of a lithium secondary battery includes carbon nanofibers and silicon particles, wherein the silicon particles are coated with amorphous silica ($SiO_2$). In the silicon-carbon composite of the invention, the silicon particles coated with amorphous silica are dispersed in the carbon nanofibers.

The silicon-carbon composite of the invention is a fibrous composite having a one-dimensional structure, that is, a composite of amorphous silica-coated silica and carbon. Because silicon is provided in the form of a composite with carbon, much higher lithium ionic conductivity and electrical conductivity can be exhibited, compared to when using silicon metal. Furthermore, upon lithium ion insertion, volume expansion may be reduced by the carbon and amorphous silica applied on the silicon metal particles.

In the silicon-carbon composite, the amount of the silicon particles may be set to 3~60 vol %. If the amount of the silicon particles is greater than 60 vol %, silicon is not appropriately enclosed by the carbon nanofibers, making it impossible to sufficiently suppress volume expansion. In contrast, if the amount thereof is less than 3 vol %, the amount of silicon which is the main active material that is alloyed with lithium is small, undesirably excessively decreasing energy density.

The amount of amorphous silica may be 0.1~25 wt % based on the total weight of silicon particles and amorphous silica. If the amount of amorphous silica is greater than 25 wt %, the volume expansion of silicon which is the main active material in the silicon-carbon composite may be further controlled, but the energy density becomes excessively low. In contrast, if the amount thereof is less than 0.1 wt %, it is difficult to control the volume expansion of silicon by amorphous silica.

A method of preparing the silicon-carbon composite of the invention is described below.

The silicon-carbon composite for a negative active material of a lithium secondary battery according to the present invention may be prepared by electrospinning a mixture solution including a polymer material and silicon particles to form a composite having a one-dimensional structure, which is then heat-treated.

The polymer material is a precursor which provides carbon in the silicon-carbon composite, and its kind is not particularly limited so long as it may provide carbon via carbonization. Examples of the polymer material include polyacrylonitrile (PAN), polyvinyl alcohol (PVA), polyvinylpyrrolidone (PVP), polyethylene oxide (PEO), polyvinylidene fluoride (PVDF), polymethylmethacrylate (PMMA), polyacrylic acid, polyurethane, etc. Particularly useful is polyacrylonitrile. It is preferred that the polymer material be combined with an appropriate solvent because the kind of solvent that is able to dissolve a polymer is limited depending on the intrinsic characteristics of a polymer such as hydrophilicity, hydrophobicity, etc.

Upon preparing the mixture solution, the polymer material is used in an amount of 3~20 parts by weight based on 100 parts by weight of the solvent. If the amount of the polymer material is less than 3 parts by weight, a kind of lumped portions such as beads may be formed per structure due to low viscosity upon electrospinning, making it impossible to produce uniform fibers having a predetermined thickness. In contrast, if the amount thereof is greater than 20 parts by weight, the silicon particles may aggregate because of an excess of the polymer, making it impossible to control volume expansion of the silicon particles by the carbon and partially aggregating the polymer material to thereby form beads and a non-uniform thickness.

Examples of the solvent used to prepare the mixture solution may include ethanol, methanol, propanol, butanol, isopropyl alcohol (IPA), dimethylformamide (DMF), acetone, tetrahydrofuran (THF), toluene, distilled water ($H_2O$), etc. The solvent has a boiling point of about 120° C. at a maximum and may be appropriately used depending on the hydrophilicity or hydrophobicity of the polymer material. In the case of a hydrophilic polymer, not only an organic solvent but also water ($H_2O$, distilled water) may be used. Particularly useful is dimethylformamide when polyacrylonitrile is applied as the polymer material.

Upon preparing the mixture solution, the mixture solution is stirred at 25~80° C., thereby obtaining a homogeneous solution. When the polymer material is dissolved in the solvent, the dissolution temperature may vary depending on the characteristics of the polymer material. If the dissolution does not take place at an appropriate temperature, uniform fibers cannot be obtained, and electrospinning is not continuously performed. In particular, the case where polyacrylonitrile is dissolved in dimethylformamide may be implemented at about 60° C.

The amount of the silicon particles may be set to 5~30 parts by weight based on 100 parts by weight of the polymer material. If the amount thereof is less than 5 parts by weight, the amount of silicon contained in the final silicon-carbon composite is small, undesirably reducing the energy density of an electrode. In contrast, if the amount thereof is greater than 30 parts by weight, the silicon particles may aggregate due to their high surface energy upon manufacturing the amorphous silica ($SiO_2$)-coated silicon-carbon composite, and thus a secondary phase is mainly formed, and carbon resulting from carbonizing the polymer material is not uniformly distributed, making it impossible to effectively suppress volume expansion.

The prepared mixture solution is formed into a composite having a one-dimensional structure using an electrospinning process. The electrospinning process may be conducted using a typical electrospinning device, for example, an electrospinning device comprising a feeder for feeding a solution, a spinning nozzle for spinning the solution fed via the feeder, a collector for gathering fibers spun via the spinning nozzle, and a voltage generator for applying a voltage between the spinning nozzle and the collector.

In the present invention, the mixture solution prepared in the previous step is fed via the feeder of the electrospinning device, and is transferred into the spinning nozzle and thus spun. At this time, the mixture solution is electrospun by a (+) voltage applied to the nozzle from the voltage generator, and then gathered via the collector having a (−) voltage.

The (+) voltage of the electrospinning process enables the solvent to volatilize and the polymer chain of the polymer material to droop in a state of enclosing silicon contained in the solution at the same time, resulting in a fibrous structure longitudinally extending in a one-dimensional structure. The electrospun fibrous material is collected by means of the collector having (−) charges via an electric field. The (+) or (−) voltage upon electrospinning may vary depending on the polymer material and the solvent.

Upon electrospinning, the thickness and quality of fibers are determined by the applied voltage (kV/cm) per distance, the amount of injected solution (ml/min, ml/hr, l/hr), and the nozzle (or needle). The (+) voltage upon electrospinning is adjusted by the intrinsic characteristics of the polymer material, and by the distance between the collector and the nozzle. In the case of the amount of injected solution, when the solution is rapidly injected, a higher (+) voltage is required, and the extent of preparation may be adjusted over time. Also, a variety of nozzles having different sizes ranging from 15 gauge (inner diameter of about 1.4 mm) to 32 gauge (inner diameter of about 0.1 mm) are exemplified. The nozzle for use in electrospinning is first determined by the kind of polymer material, and the kind thereof is appropriately selected from among nozzles having sizes ranging from 17 gauge (inner diameter of about 1.05 mm) to 25 gauge (inner diameter of about 0.25 mm). The uniformity and thickness of the fibers are determined depending on the selected nozzle.

The composite having a one-dimensional structure prepared using electrospinning is then heat-treated, so that the silicon particles are partially oxidized and the polymer material is carbonized at the same time, thus obtaining a final amorphous silica ($SiO_2$)-coated silicon ($SiO_x$, $0 \leq x \leq 2$)-carbon composite.

The heat treatment is preferably implemented via primary heat treatment at 230~300° C. for 1~10 hr in an air environment, and secondary heat treatment at 500~900° C. for 1~7 hr in a gas mixture environment of an inert gas and a reducible gas. More preferably, the mixture solution is primarily heat-treated at 230° C. for 7 hr, and is then secondarily heat-treated at 700° C. for 1 hr.

In the primary heat treatment, if the temperature is lower than 230° C., the solvent in which the polymer and the silicon particles are dissolved and moisture or the like are not sufficiently evaporated, undesirably rendering it impossible to obtain powder after heat treatment or forming an unstable structure upon secondary heat treatment. In contrast, if the temperature is higher than 350° C., carbonization partially proceeds in a state of the solvent and moisture not having evaporated, and thus the structure is not maintained. Also in the secondary heat treatment, if the temperature is lower than 500° C., the polymer material is not sufficiently carbonized. In contrast, if the temperature is higher than 900° C., too many silicon particles are oxidized and thus the amount of silicon (Si) having electrochemically high energy density becomes too small.

As such, examples of the inert gas may include helium (He), nitrogen ($N_2$), argon (Ar), neon (Ne), xenon (Xe), etc., and an example of the reducible gas may include hydrogen ($H_2$).

In the case where an inert gas is not used, carbon is completely volatilized due to carbonization of the polymer material, and thus the structure is not supported, and the structure having a large amount of only amorphous silica ($SiO_2$) on the surface thereof without carbon is provided, undesirably making it impossible to properly conduct an electrochemical reaction.

When the heat treatment is performed in this way, heat decomposition of the polymer material and the evaporation of the solvent may take place via the primary heat treatment, thus obtaining a polymer-silicon composite having a one-dimensional fibrous structure. Subsequently, when the composite thus obtained is instantly subjected to secondary heat treatment, silicon particles are partially oxidized and the polymer material is carbonized without exerting any influence on the structural or physical characteristics, thereby forming an amorphous silica ($SiO_2$)-coated silicon metal-carbon composite having a one-dimensional fibrous structure.

A better understanding of the present invention may be obtained via the following examples which are set forth to illustrate, but are not to be construed as limiting the present invention. Those skilled in the art will appreciate that various modifications, additions and substitutions are possible, without departing from the scope and spirit of the invention as disclosed in the accompanying claims.

EXAMPLE 1

Preparation of Amorphous Silica ($SiO_2$)-Coated Silicon Metal-Carbon Composite Using Silicon Power Particles Polyacrylonitrile and dimethylformamide at a mass ratio of 11:89 were heated to 60° C. in order for the solute to dissolve, silicon powder particles were added at a ratio of 2:8 to the polyacrylonitrile, and then the mixture was stirred, thus obtaining a homogeneous mixture solution.

Subsequently, the mixture solution was electrospun in such a manner that it was fed via a feeder of an electrospinning device, and a (+) voltage of 0.7 kV/cm or more was applied when the transferred mixture solution was spun via a spinning nozzle, whereby the spun fibers were gathered via a collector having a (−) voltage, thus obtaining a fibrous composite having a one-dimensional structure.

The fibrous composite thus prepared was subjected to primary heat treatment at 280° C. for 5 hr in an air environment and then secondary heat treatment at 700° C. for 1 hr in a gas mixture environment of an inert gas and a reducible gas, namely, argon/hydrogen (Ar/$H_2$ 5%), thereby preparing an amorphous silica ($SiO_2$)-coated silicon metal-carbon composite having a one-dimensional structure.

TEST EXAMPLE 1

X-ray Photoelectron Spectroscopy

To analyze the silicon component through the oxidation number of silicon in the silicon-carbon composite prepared in Example 1, X-ray photoelectron spectroscopy (XPS) was conducted. The results are shown in FIG. 1.

Typical silicon and silicon oxide are present in the form of SiO in which the oxidation number is zero at about 99.5 eV, namely, in a state of silicon not being coupled with oxygen or another material. In the case of the amorphous silica ($SiO_2$)-coated silicon metal-carbon composite of Example 1 according to the present invention, as shown in the XPS results of FIG. 1, not only crystalline Si (SiO) at about 99.6 eV but also $SiO_2$ in a state of $Si^{4+}$ in which silicon was oxidized at about 103.8 eV can be seen to be present.

TEST EXAMPLE 2

Surface Analysis Using SEM and TEM

Figure 2:
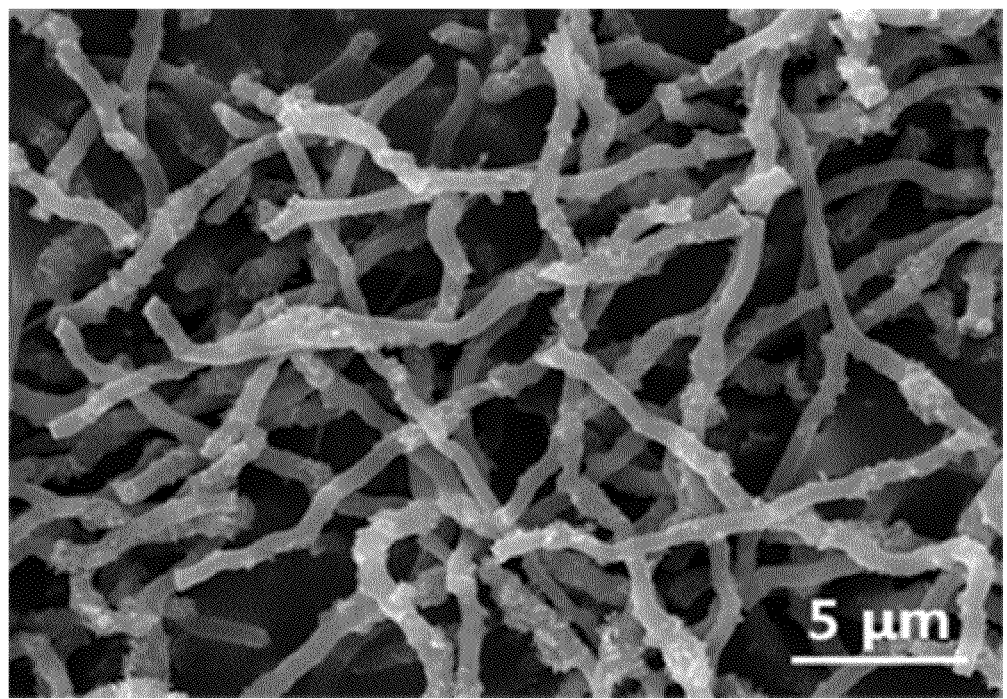
FIG. 2 illustrates a scanning electron microscope (SEM) image of the surface of the amorphous silicon oxide ($SiO_2$)-coated silicon ($SiO_x$, $0 \leq x \leq 2$)-carbon composite, according to the embodiment of the present invention.
Figure 3:
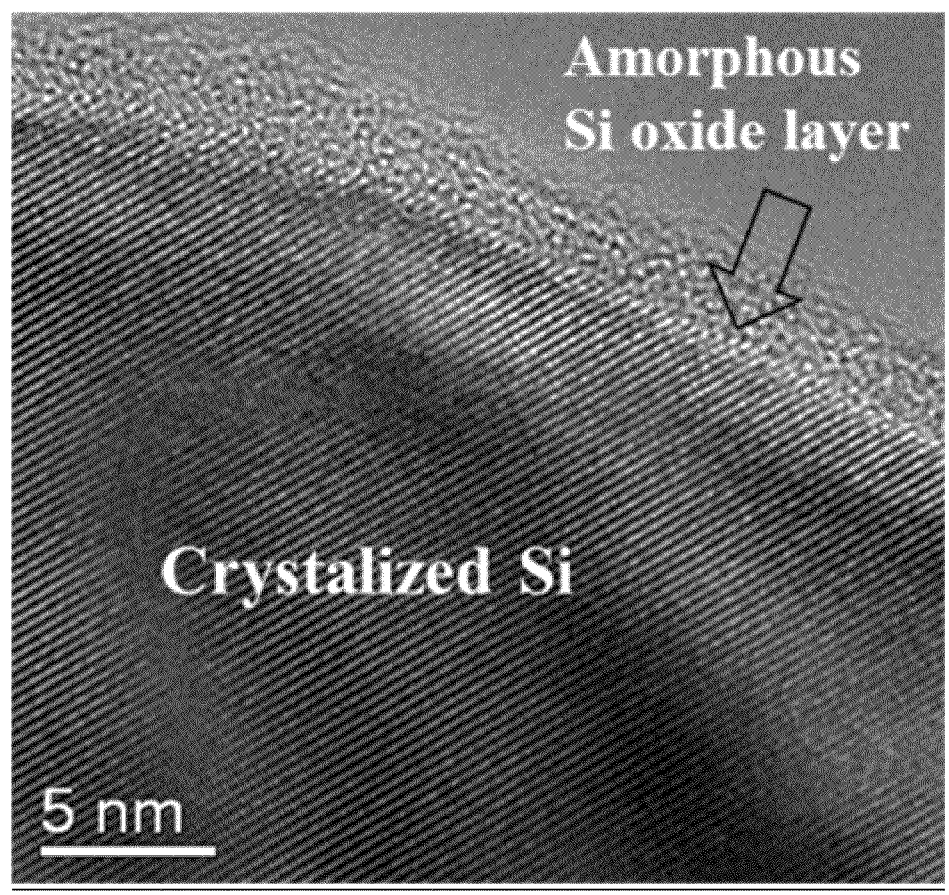
FIG. 3 illustrates a transmission electron microscope (TEM) image of the amorphous silicon oxide ($SiO_2$)-coated silicon ($SiO_x$, $0 \leq x \leq 2$)-carbon composite, according to the embodiment of the present invention.

To analyze the entire fibrous structure of the silicon-carbon composite prepared in Example 1 and the coating layer on the surface of the silicon particles, SEM and TEM images are shown in FIGS. 2 and 3. As seen in the SEM image of FIG. 2, the silicon-carbon composite subjected to electrospinning and then heat treatment had a uniform thickness and the fiber shape thereof was maintained well. In the TEM image of FIG. 3 showing the surface of the silicon particles of the silicon-carbon composite subjected to electrospinning and then heat treatment, the crystalline silicon metal and the amorphous layer on the surface of the silicon were observed. From these results and the results of Test Example 1, the silicon metal particles can be seen to be coated with amorphous silica ($SiO_2$) in which the silicon was oxidized.

The silicon particles of the silicon-carbon composite prepared in Example 1 were dispersed in the carbon fibers, and the very thin amorphous silica layer was present on the surface of silicon.

TEST EXAMPLE 3

Measurement of Discharge Capacity and Analysis of Coulombic Efficiency

Into a half battery manufactured using the negative active material, lithium was inserted (charged) with constant current at C/20 and constant voltage at C/100 up to 0.05 V upon first charge and then released (discharged) at C/20 up to 1.5 V, after which charge-discharge cycling was conducted between 0.05 and 1.5 V at C/5 from the second cycle. The discharge capacity results of the charge-discharge characteristics are shown in FIG. 4.

Figure 4:
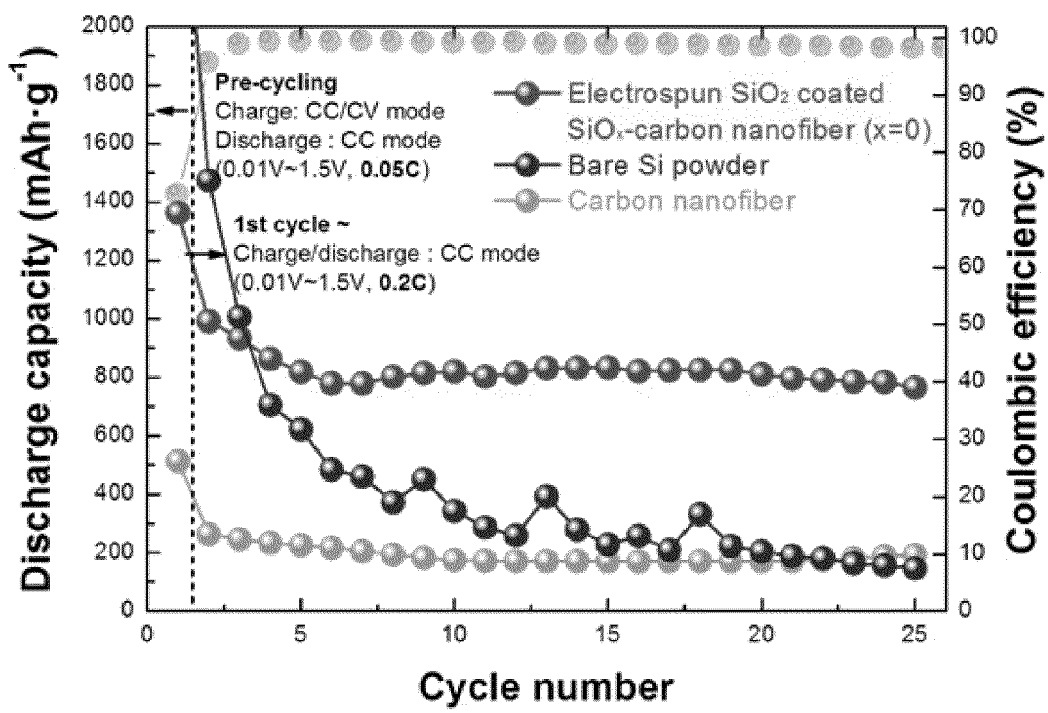
FIG. 4 illustrates discharge capacity results of a silicon ($SiO_x$, $0 \leq x \leq 2$)-carbon composite electrode in which the surface of the one-dimensional structure is coated with amorphous silicon oxide ($SiO_2$), according to an embodiment of the present invention, and a silicon metal electrode.

As shown in FIG. 4, upon first discharge, the silicon metal exhibited a very high capacity, but as the charge-discharge cycling was repeated at least ten times, the capacity was drastically reduced. However, the silicon-carbon composite of Example 1 according to the present invention manifested lower capacity than that of silicon metal upon first discharge due to the addition of carbon, but as the charge-discharge cycling was repeated about 25 times, high capacity was maintained, compared to when using the silicon metal.

Therefore, the silicon-carbon composite of Example 1 according to the present invention is advantageous because of the presence of the amorphous silica layer on the surface of silicon and the formation of a uniform composite with carbon, and thus it can relieve volume expansion despite the possibility of volume expansion of silicon due to the repeated charge-discharge cycling, thereby maintaining high capacity, compared to when using silicon (Si) metal. Consequently, the silicon-carbon composite of the invention can be confirmed to be adapted for a negative active material of a lithium secondary battery.

As described hereinbefore, the present invention provides a silicon-carbon composite for a negative active material of a lithium secondary battery. According to the present invention, silicon is provided in the form of a composite with carbon fibers, and the surface of silicon particles is coated with amorphous silica, whereby volume expansion can be reduced upon lithium ion insertion, and superior ionic conductivity and electrical conductivity can be obtained, thereby maintaining high capacity.

Also according to the present invention, the silicon-carbon composite for a negative active material of a lithium secondary battery is configured such that amorphous silica-coated silicon is positioned on the surface of or inside the carbon fibers having a one-dimensional structure, thus forming a large specific surface area and a stable composite structure.

Further, the silicon-carbon composite of the invention can be applied to a lithium secondary battery, thus increasing capacity and efficiency of the lithium secondary battery, resulting in improved electrochemical characteristics of the battery.

What is claimed is:

1. A silicon-carbon composite for a negative active material of a lithium secondary battery, the silicon-carbon composite comprising carbon nanofibers and silicon particles, wherein:
   the silicon particles are coated with amorphous silica; and
   the amorphous silica-coated silicon particles are dispersed inside the carbon fibers having a one-dimensional structure due to encapsulation of the amorphous silica-coated silicon particles by the carbon nanofibers, the encapsulation resulting from electrospinning of a mixture solution comprising a polymer material and the silicon particles to form the composite having the one-dimensional structure.

2. The silicon-carbon composite of claim 1, wherein an amount of the silicon particles is 3~40 vol % based on a total amount of the silicon carbon composite.

3. The silicon-carbon composite of claim 1, wherein a weight ratio of the silicon particles to the amorphous silica is 1:0.2~20.

4. The silicon-carbon composite of claim 1, wherein the polymer material comprises at least one selected from the group consisting of polyacrylonitrile (PAN), polyvinyl alcohol (PVA), polyvinylpyrrolidone (PVP), polyethylene oxide (PEO), polyvinylidene fluoride (PVDF), polymethylmethacrylate (PMMA), polyacrylic acid, and polyurethane.

5. The silicon-carbon composite of claim 1, wherein the electrospinning is performed at a humidity of 36% or less and a temperature of 34° C. or less.

6. The silicon-carbon composite of claim 1, wherein the electrospinning is performed using a nozzle having a size ranging from 17 gauge to 25 gauge.

7. The silicon-carbon composite of claim 1, wherein the electrospinning is performed by applying a voltage of 0.5~3.0 kV/cm.

8. The silicon-carbon composite of claim 1, wherein the heat-treating is performed via primary heat treatment at 230~300° C. for 1~10 hr and then secondary heat treatment at 500~900° C. for 1~7 hr.

9. The silicon-carbon composite of claim 8, wherein the secondary heat treatment is performed in a gas mixture environment of an inert gas and a reducible gas.

10. A negative electrode of a lithium secondary battery, comprising the silicon-carbon composite of claim 1.

11. A lithium secondary battery comprising the negative electrode of claim 10.

* * * * *